(No Model.)
T. R. CRANE.
HARROW.
No. 364,575. Patented June 7, 1887.
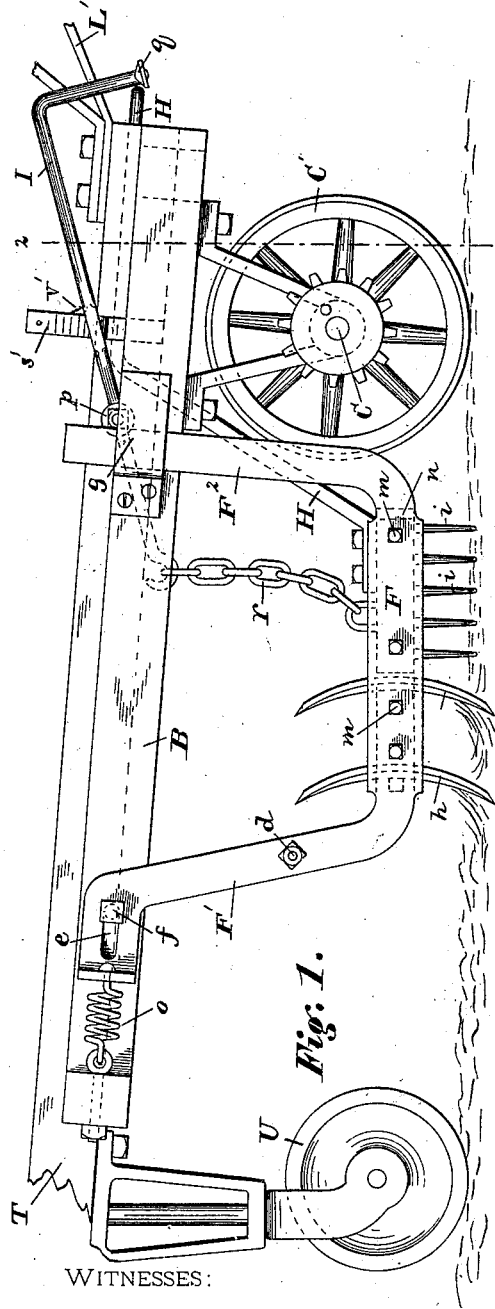
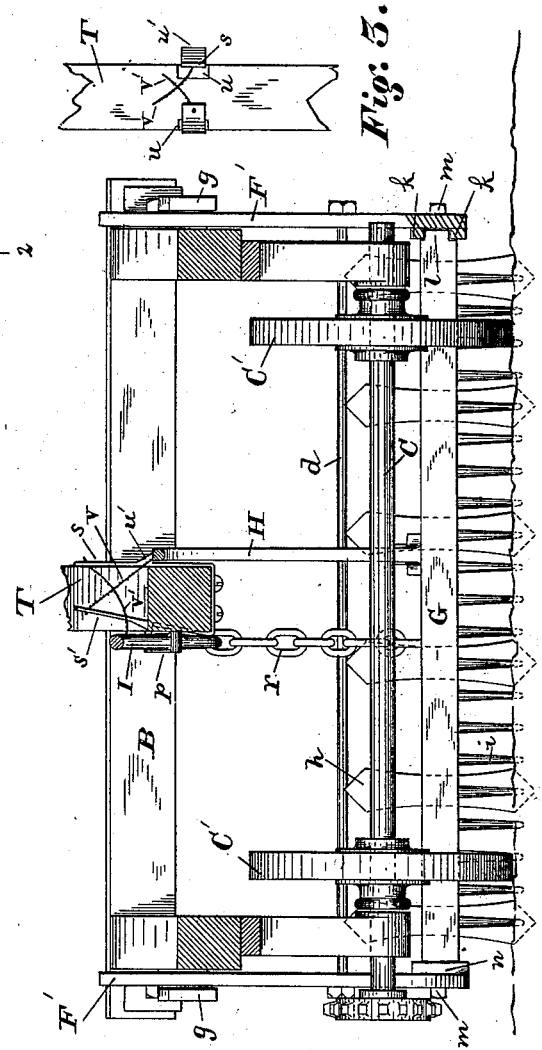
WITNESSES:
J. K. E. Diffenderffer.
John E. Morris
INVENTOR:
Thos. R. Crane
By Chas. B. Mann
ATTORNEY.

UNITED STATES PATENT OFFICE.

THOMAS R. CRANE, OF HEATHSVILLE, VIRGINIA.

HARROW.

SPECIFICATION forming part of Letters Patent No. 364,575, dated June 7, 1887.

Application filed March 3, 1887. Serial No. 229,541. (No model.)

*To all whom it may concern:*

Be it known that I, THOMAS R. CRANE, a citizen of the United States, residing at Heathsville, in the county of Northumberland and State of Virginia, have invented certain new and useful Improvements in Harrows, of which the following is a specification.

My invention relates to an improved harrow, and is illustrated in the accompanying drawings, in which—

Figure 1 is a side view of the harrow. Fig. 2 is a vertical cross-section on the line 2 2; and Fig. 3 is a top view of parts of the draft-beam, showing the catches.

The letter B designates the frame, C the axle, and C' two wheels on the axle which support the machine.

The harrow comprises two side irons, F F' F², the cross-beams G between said side irons, and the prongs or teeth $h$ $i$, attached to the cross-beams. Each side iron has a straight horizontal part, F, provided on its inner side with an upper and lower longitudinal flange, $k$, which together form a groove, $l$, between them. The ends of the cross-beams G occupy the said groove $l$, and bolts $m$ may be employed to secure them. At the rear end of the groove $l$ is a vertical flange or shoulder, (indicated at $n$,) which closes said groove and prevents the cross-beams from escaping backward. A cross-rod, $d$, connects the two side irons. The cross-beams and teeth may be removed and others of different form inserted. Any desired or well-known style of harrow-tooth may be used, as the same will not affect my invention, hereinafter pointed out.

At each end of the straight horizontal part F the side irons have an upward-projecting arm, F' and F². The end of the front arm, F', has a horizontal slot, $e$, and a pivot-bolt, $f$, fixed in the frame occupies the slot. This device at each side serves to pivot the front end of the harrow to the frame. Each rear arm, F², of the harrow occupies loosely a keeper, $g$, on the side of the frame, and thereby the rear part of the harrow is free to be raised or lowered.

A feature of my invention consists of the combination and arrangement, with the frame B and harrow F F' of the connecting-spring $o$, between the frame and harrow. The spring $o$ is of the spiral form, and has one end attached to the front beam of the frame and the other end to the harrow-arm F'. Thus the draft-strain of the harrow comes entirely on the spring. In operation the spring is of great advantage. If a tooth of the harrow comes in contact with some unyielding object in the ground, the spring yields and allows the entire harrow to give back, thereby affording time for the harrow to relieve itself by moving to one side or rising. The spring will save the teeth as well as other parts of the harrow from injury.

The slot $e$ provides both for the pivoting result and the yielding or spring result. There is coaction, therefore, between the spring and harrow-arm having the slot and the pivot-bolt in the slot.

An arm, H, is rigidly secured on the harrow cross-beams G, and inclines up and rearward and over the rear beam of the draft-frame B. The seat for the driver is supported on the brace-bars L'. The driver may place his foot on the rigid arm H, and by bearing down on it press the teeth of the harrow in the ground.

A lever, I, is pivoted to the draft-frame at $p$, and its rear end has a foot-rest, $q$, for the driver's foot. A chain, $r$, connects its front end to the harrow-beams G. By bearing down on the foot-rest of the lever the entire harrow-frame F G may be elevated from the ground.

I provide two spring-catches, $s$ $s'$, which are each attached to an opposite side of the draft-pole T on the frame. The draft-pole has a notch, $u$, on each vertical side, and the said two plate-spring-catches are secured on the lower side of the draft-pole, and each one extends up at one of the side notches, $u$. The catches have a lug or shoulder, $u'$, which project away from the draft-pole. The rigid arm H comes up at one side of the draft-pole in near relation to one catch, $s$, and the lug $u'$ thereon, when the said arm H is depressed, takes over the arm and holds it down. The lever I comes up at the other side of the draft-pole close by the catch $s'$, and the lug $u'$ thereon, when the said lever I is depressed, takes over the lever and holds it down. The lever I must be raised when the arm H is depressed, and vice versa. In order to cause the spring-catches $s$ $s'$ to act automatically, a small chain, $v$, or equivalent device—such as a wire or cord—connects the arm H on one side of the draft-pole with the catch $s'$ on the opposite side, and a like chain, $v'$, connects the lever I with the catch $s$. The two small chains $v\ v'$ cross each other, and are so arranged that when either the arm H or the lever I is depressed by the driver's foot the one depressed will draw on its chain which is attached to the spring-catch holding the other; thereby the said spring-catch will be released. Thus when the arm H is depressed the spring-catch holding the lever will be automatically released, and vice versa. A caster-wheel, U, supports the front of the frame B.

The wheels C' may be removed at any time, and a roller secured on the same axle on which the wheels now turn.

Having described my invention, I claim and desire to secure by Letters Patent of the United States—

1. In a harrow, the combination of a draft-frame, B, a toothed harrow having a horizontal part, F, provided with front and rear upward-projecting arms, F' F², a spring, $o$, between the draft-frame and front arm, and a keeper, $g$, on the draft-frame for the rear arm.

2. In a harrow, the combination of a draft-frame, B, a toothed harrow having a front arm, F', provided with a horizontal slot, $e$, a pivot-bolt, $f$, fixed to the draft-frame and occupying the slot, and a spring connecting the draft-frame and harrow.

3. In a harrow, the combination of a draft-frame, B, a toothed harrow having a front arm, F', pivoted to the draft-frame, an arm, H, rigidly secured on the harrow and extending up and rearward, a lever, I, pivoted to the draft-frame and having its front end connected with the harrow, two catches, one for the rigid arm and the other for the lever, and a flexible connection, $v$, between the rigid arm and lever-catch, and another flexible connection, $v'$, between the lever and arm catch, for the purpose set forth.

In testimony whereof I affix my signature in the presence of two witnesses.

THOMAS R. CRANE.

Witnesses:
JOHN E. MORRIS,
JNO. T. MADDOX.